Sept. 12, 1944.    D. S. GRANBERRY    2,357,891
ELECTRIC BALANCE OR SCALE
Filed Aug. 18, 1942
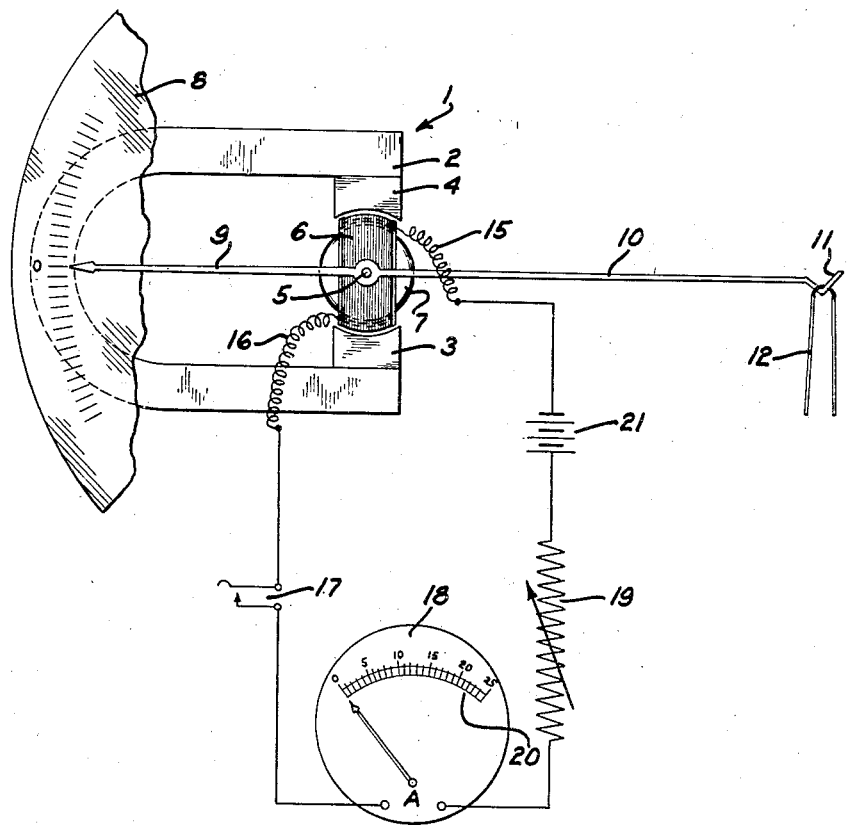
INVENTOR
D. S. GRANBERRY
BY
ATTORNEY Patented Sept. 12, 1944

2,357,891

UNITED STATES PATENT OFFICE 2,357,891

ELECTRIC BALANCE OR SCALE

Doyle S. Granberry, La Grange, Ill., assignor to Western Electric Company, Incorporated, New York, N. Y., a corporation of New York Application August 18, 1942, Serial No. 455,202

8 Claims. (Cl. 265—27)

This invention relates to electrical weighing apparatus and more particularly to an electric torsion type balance for weighing articles.

It is an object of the present invention to provide a simple apparatus for accurately and expeditiously weighing articles.

In accordance with one embodiment of the invention, a specimen to be weighed is hung on a hook or holder formed integrally with the pointer of an electric torsion movement to displace the movement and carry its pointer from a normal or mid position on a cooperating scale. The moving coil of the movement may be connected, by the closure of a suitable switch, through an ammeter and an adjustable resistance in series with a source of current. The adjustable resistance may then be adjusted so that the current flowing in the circuit will return the movement to normal position, as indicated by the position of its pointer with respect to its cooperating scale. The ammeter used in the circuit is calibrated in terms of weight and the amount of current necessary to return the movement to normal will be registered on the ammeter in terms of the weight of the article being measured.

A better understanding of the invention may be had by reference to the following detailed description when considered in conjunction with the accompanying drawing, wherein the single figure is a schematic diagram of a weighing apparatus made in accordance with the present invention.

In the drawing, an electric torsion movement, designated generally by the numeral 1, is shown provided with a permanent magnet 2 of the usual type having pole pieces 3 and 4. Positioned between the pole pieces 3 and 4 and rotatable about a pivot or suspension 5 of any suitable type is a moving coil 6 which surrounds a central core member 7. The central core member 7 and pivot support for the moving coil 6 may be suitably mounted with respect to the magnet structure so that the coil 6 may rotate through an arc with portions of it extending between the core 7 and the poles 3 and 4, as is usual in rotary armature type electric apparatus. The torsion movement 1 is provided with the usual scale plate 8 for cooperation with a pointer 9 fixed to the moving coil 6.

Extending to the right of the coil 6 and formed integrally with or suitably secured to the pointer 9 is a balance arm 10 having a hook portion 11 on which an article 12 may be hung. The article 12 may be any article to be measured and it has been found that an apparatus of the present type is suitable for measuring very light articles, such as the filaments of incandescent lamps and, accordingly, the article 12 in this particular case has been illustrated as a lamp filament.

The moving coil 6 is provided with lead-in wires 15 and 16 connected to opposite ends of its winding. These wires may be flexible, and may constitute the centering springs, as is usual in meter movements, so that the rotation of the moving coil under the influence of the current passed through the coil will not be appreciably interfered with by the lead-in wire. The lead-in wire 16 is connected to a switch 17 for connecting one side of the moving coil 6 to one side of the actuating winding of an ammeter 18. The lead-in wire 15 is connected to one side of a source of current 21, the other side of which is connected through a variable resistance 19 to the other side of the actuating winding of the ammeter 18.

Since the amount of torque produced by the weight of the specimen on the balance arm 10 may be counteracted by directing current through the moving coil 6 and the amount of current necessary to counteract the weight of the article 12 and return the pointer 9 to zero or normal position is commensurate with the weight of the article, the scale 20 of the ammeter 18 may be calibrated directly in terms of weight.

In practice, the specimen 12 to be weighed may be placed on the hook 11 and the electric current flowing from the battery 18 through the moving coil 6 is adjusted until the torque produced by the weight of the specimen or article 12 has been balanced, as indicated by the return of the pointer 9 to normal position. The amount of current required to produce this condition is commensurate with the weight of the article and since the ammeter 18 has its scale plate calibrated in terms of weight, the weight of the article may be read on the ammeter 18.

What is claimed is:

1. In an electrical weighing apparatus, a fixed magnetic field, an armature rotatable in said field and having its field displaced substantially 90° from the fixed field, an article supporting lever attached to said armature for applying a torque to the armature in one direction, means for applying an electrical current to said armature to oppose movement thereof in said direction, and means for measuring the amount of current applied to said armature to hold it against movement by said article and to thereby indicate the weight of the article.

2. In an electrical weighing apparatus, a fixed magnetic field, an armature rotatable about an axis within said field and extending through the armature, an article supporting lever attached to said armature for applying a torque tending to rotate the armature on its axis in one direction, means for applying an electrical current to said armature to oppose movement thereof in said direction, and means for measuring the amount of current applied to said armature to hold it against movement by said article and to thereby indicate the weight of the article, said last mentioned means comprising an ammeter calibrated in terms of weight.

3. In an electrical weighing apparatus, a permanent magnet having pole pieces for establishing a fixed magnetic field, an armature rotatable between said pole pieces, an article supporting lever attached to said armature for applying a torque to the armature in one direction, means including a current source and a variable current controlling means for applying an electrical current to said armature to oppose movement thereof in said direction, and means for measuring the amount of current applied to said armature to hold it against movement by said article and to thereby indicate the weight of the article.

4. In an electrical weighing apparatus, a fixed magnetic field, an armature rotatable in said field, an article supporting lever attached to said armature for applying a torque to the armature in one direction about an axis extending through the armature, means including a current source and a variable resistance for controlling the flow of current from said source for applying an electrical current to said armature to oppose movement thereof in said direction, and means for measuring the amount of current applied to said armature to hold it against movement by said article and to thereby indicate the weight of the article.

5. An electric weighing apparatus, comprising a meter movement including a magnet structure having a stationary field, a current responsive coil rotatable about an axis extending through the armature in said field, an arm fixed to said coil for receiving an article to be weighed to apply torque tending to rotate said coil from a normal position, means for supplying a variable amount of current to apply an opposing torque to said coil to tend to return it to normal, and means for indicating the amount of current necessary to return said coil to normal for indicating the weight of the article.

6. In a weighing apparatus, the combination with an electric current meter movement having a pointer and a hook or specimen holder rigidly attached to the pointer, of a source of electric current connected to said meter, means for controlling the amount of current supplied from said source to said meter to overcome the effect of the specimen on its pointer, and means for measuring said current flow to indicate the weight of the specimen.

7. In an electrical weighing apparatus, a fixed magnetic field, an armature rotatable about an axis extending through the armature in said field, an article supporting lever attached to said armature for applying a torque to the armature in one direction, means including a current source and a variable resistance for controlling the flow of current from said source for applying an electrical current to said armature to oppose movement thereof in said direction, and means for measuring the amount of current applied to said armature to hold it against movement by said article and to thereby indicate the weight of the article, said last mentioned means comprising an ammeter calibrated in terms of weight.

8. An electric torsion type balance comprising a permanent magnet having adjacent poles for establishing a stationary field, a rotatable coil in said field and rotatable about an axis extending between said poles, a balance arm fixed to said coil for supporting an article to be weighed, means for supplying a variable amount of current to said movable coil, and an ammeter in series with said coil to indicate the amount of current necessary to counter-balance the effect of the article on the balance arm.

DOYLE S. GRANBERRY.